US009177461B2

(12) United States Patent
Middleton (10) Patent No.: US 9,177,461 B2
(45) Date of Patent: Nov. 3, 2015

(54) PORTABLE FLUID LEVEL ALARM SYSTEM (71) Applicant: Kenneth Shea Middleton, Corpus Christi, TX (US)

(72) Inventor: Kenneth Shea Middleton, Corpus Christi, TX (US)

( * ) Notice: Subject to any disclaimer, the term of this patent is extended or adjusted under 35 U.S.C. 154(b) by 0 days.

(21) Appl. No.: 14/216,328

(22) Filed: Mar. 17, 2014

(65) Prior Publication Data

US 2014/0266745 A1 Sep. 18, 2014

Related U.S. Application Data (60) Provisional application No. 61/799,767, filed on Mar. 15, 2013.

(51) Int. Cl.
*G08B 21/00* (2006.01)
*G08B 21/18* (2006.01)
*G01F 23/00* (2006.01)

(52) U.S. Cl.
CPC ............. *G08B 21/182* (2013.01); *G01F 23/00* (2013.10)

(58) Field of Classification Search
CPC .............................. G08B 21/18; G08B 21/182
USPC ........................ 340/618, 623, 624, 625, 612
See application file for complete search history.

(56) References Cited

U.S. PATENT DOCUMENTS

| 3,740,739 | A | | 6/1973 | Griffin, III et al. |
| 4,108,405 | A | | 8/1978 | Gibson |
| 4,162,473 | A | | 7/1979 | Utasi |
| 4,459,584 | A | | 7/1984 | Clarkson |
| 4,523,460 | A | | 6/1985 | Strickler et al. |
| 4,551,719 | A | | 11/1985 | Carlin et al. |
| 4,736,186 | A | | 4/1988 | Jones |
| 4,764,757 | A | | 8/1988 | DeMarco et al. |
| 4,879,545 | A | | 11/1989 | Aguilar |
| 6,008,728 | A | * | 12/1999 | Wesey ......................... 340/618 |
| 6,058,299 | A | | 5/2000 | Lyseng |
| 6,229,448 | B1 | | 5/2001 | Bennett, Jr. et al. |
| 7,068,175 | B1 | * | 6/2006 | Pennington ................... 340/623 |
| 7,463,160 | B2 | | 12/2008 | Crook |
| 7,880,625 | B2 | * | 2/2011 | Almoumen .................... 340/623 |
| 8,176,979 | B2 | | 5/2012 | Ollre |
| 8,786,453 | B2 | * | 7/2014 | Walbert ......................... 340/624 |
| 2003/0210140 | A1 | * | 11/2003 | Menard et al. ................ 340/531 |
| 2010/0023170 | A1 | | 1/2010 | Sherwood |
| 2010/0031573 | A1 | | 2/2010 | Whiting et al. |
| 2010/0250139 | A1 | | 9/2010 | Hobbs et al. |

* cited by examiner

*Primary Examiner* — Toan N Pham
(74) *Attorney, Agent, or Firm* — Miguel Villarreal, Jr.; Gunn, Lee & Cave, P.C.

(57) ABSTRACT

A portable solar-powered fluid level alarm system which uses a fluid level sensor electrically connected to electronic controls in a control box. The control box is mounted on an elongated member extending from a base which holds the system upright. The electronic controls within the control box operate up to four different alarms, including an audio alarm, a visual alarm, a remote notification signal via a global positioning system ("GPS"), and a remote notification signal via Voice over Internet Protocol (VoIP). The alarm system is also a keyed system so that once an alarm sounds only authorized personnel may deactivate it.

1 Claim, 10 Drawing Sheets

PORTABLE FLUID LEVEL ALARM SYSTEM

CROSS REFERENCES TO RELATED APPLICATIONS

This original non-provisional application claims priority to and the benefit of U.S. provisional application Ser. No. 61/799,767, filed Mar. 15, 2013, and entitled "Solar Powered Fluid Level Alarm System," which is incorporated by reference herein.

STATEMENT REGARDING FEDERALLY SPONSORED RESEARCH OR DEVELOPMENT

Not applicable.

BACKGROUND OF THE INVENTION

1. Technical Field

The present invention concerns a solar powered portable fluid level monitoring system with an audio and visual alarm, as well as a remote notification system for those who cannot see or hear the audio and visual alarms.

The following description of the related art and the preferred embodiment relates the present invention to an oilfield application in the oil and gas industry. It will be appreciated, however, by those with ordinary skill in the art that the present invention may have application in other fields such as, for example, the waste management industry, the flood control industry, or any other industry concerned with monitoring fluid levels.

2. Description of the Related Art

In the oil and gas industry, hydraulic fracturing (known as "fracking" or "fracing") has become a commonplace procedure to unlock and recover hydrocarbons and gas trapped within shale formations deep below the surface of the Earth. During fracing operations, large amounts of water, sand, and proprietary chemicals, known as frac fluid, are injected at the surface of a wellbore and flow into perforations created within the formation. Injecting the frac fluid creates fractures within the formation, which unlock the hydrocarbons and gas trapped therein. As part of the process, large amounts of used frac fluid are generated and subsequently recovered from the wellbore. The used frac fluid must be treated before it can be re-used or before it can be released back in to the environment.

Used frac fluid is often stored in one or more large, open holding tanks on the surface. These tanks may be located in the vicinity of the drilling rig or may be located a good distance away from the rig. Regardless of where the tanks are located, it is critical to monitor the amount of frac fluid to ensure that the tanks do not get overfilled and leak.

However, monitoring the level of frac fluid in a holding tank on a drill site is challenging. The surface operations are often noisy and require extreme attention to detail. With attention focused on the surface operations, monitoring frac fluid holding tanks often becomes an afterthought and operators are reminded of this important task only after a spill has already occurred.

Though systems for monitoring frac fluid levels exist, these systems tend to be cumbersome, difficult to install, and permanent in nature. For example, electrical lines may have to be run to the monitoring system at the tank and would have to be removed when the drill site closes. Installing these systems and removing them takes time and costs money. Additionally, current systems do not allow for remote notification when the monitoring system is located a distance from the holding tank and, if an alarm does sound, anyone can disable the alarm without accountability.

BRIEF SUMMARY OF THE INVENTION

The present invention is directed to a portable fluid level monitoring system. It is solar powered and easy to install. It uses a fluid level sensor electrically connected to electronic controls in a control box. The control box is mounted on an elongated member that extends from a base which holds the system upright. The electronic controls within the control box operate up to four different alarms: (1) an audio alarm; (2) a visual alarm; (3) a remote notification signal via a global positioning system ("GPS"); and (4) a remote notification signal via Voice over Internet Protocol (VoIP). It is also a keyed system so that once an alarm sounds only authorized personnel may deactivate it.

DETAILED DESCRIPTION OF THE INVENTION

Figure 1:
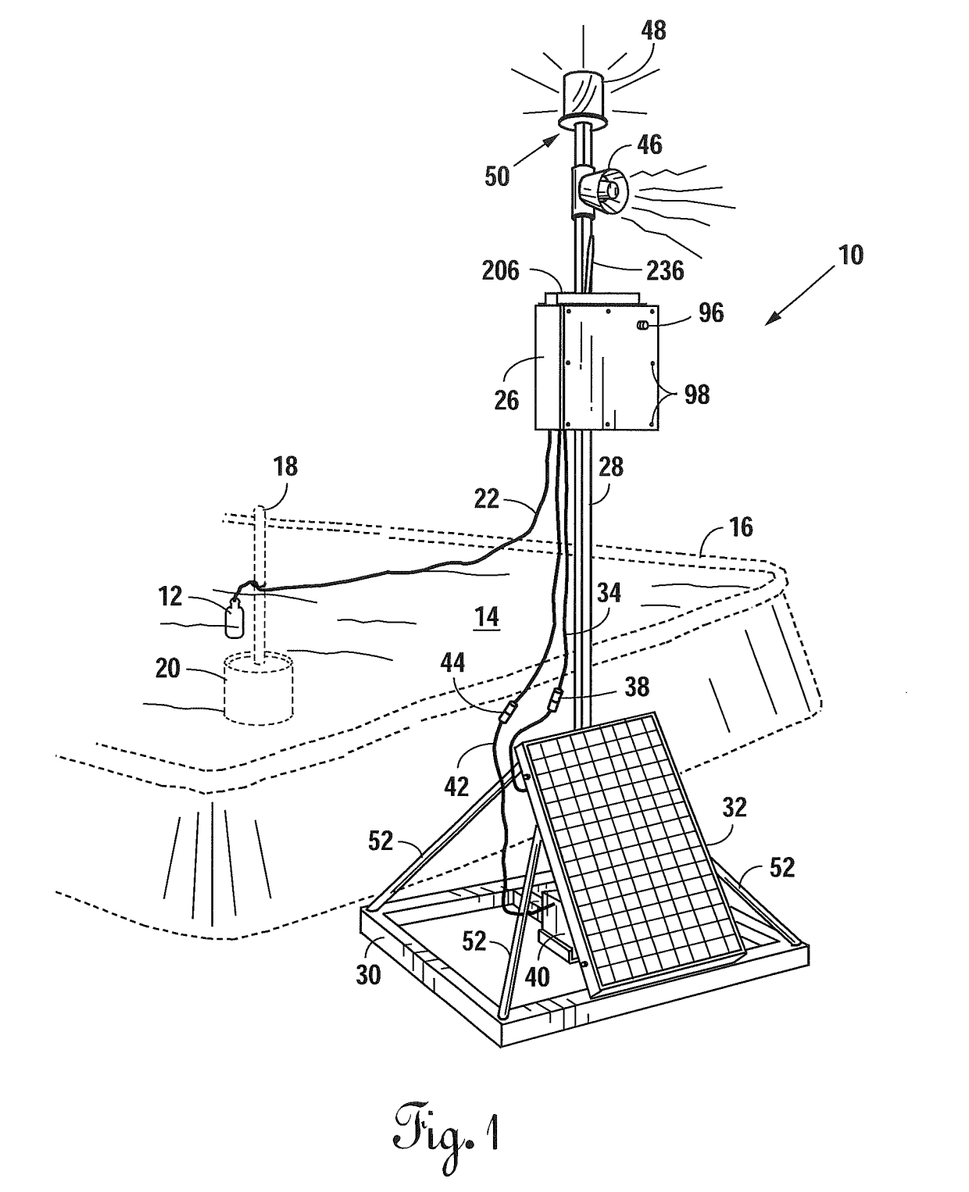
FIG. 1 is a perspective view of a preferred embodiment of the present invention being used in combination with a frac fluid holding tank.

Referring to FIG. 1, a fluid level alarm system 10 has a fluid level sensor 12 floating within fluid 14 in a holding tank 16. The fluid level sensor 12 is a float sensor; however, consideration should be given to the type of fluid 14 in the holding tank 16 and the environmental conditions the fluid level sensor 12 will encounter (e.g., heat, cold, rain, snow, etc.). For example, the density of the particular fluid 14 within the holding tank 16 and its effect on the buoyancy should be taken into account if a float sensor is used.

One float sensor which has been found acceptable in the frac fluid environment is a SJE Signalmaster® Control Switch Model No. 30SGMPCNO sold by the SJE Rhombus® Company. This float sensor closes the circuit (see FIG. 9) to activate the alarm system 10 when it is tipped slightly above horizontal. In this embodiment, the preferred fluid level sensor 12 is mounted to a pole 18 which is anchored to a weight 20 in the holding tank 16. The length of the pole 18 and position of the fluid level sensor 12 on the pole 18 is determined by the height of the holding tank 16 so that the preferred fluid level sensor 12 tips slightly above horizontal when the level of fluid 14 approaches the maximum capacity of the holding tank 16.

The fluid level sensor 12 is electrically connected to the alarm system 10 via a fluid sensor cable 22 extending from the fluid level sensor 12 to electronic controls 24 (see FIG. 10) in a control box 26. The control box 26 is mounted on an elongated portion 28 of the system 10 which extends from a base 30. The base 30 holds the elongated portion 28 upright. Preferably, the base 30 and the elongated portion 28 are constructed of a lightweight, rigid material durable enough to withstand the environmental challenges encountered by the alarm system 10. For example, in an oilfield application where the alarm system 10 encounters constant exposure in an outdoor environment it has been found that hollow steel tubing with a square profile is a suitable material given its relatively light weight and durability.

A solar panel 32 is mounted to the alarm system 10, preferably in a position between the elongated portion 28 and the base 30. However, the solar panel 32 could be mounted elsewhere on the alarm system 10. The solar panel 32 is electrically connected via a solar connection cable 34 to a solar charge controller 36 that is part of the electronic controls 24 in the control box 26 (see FIG. 10) as discussed in more detail infra. Preferably, the solar connection cable 34 has a plug-in connector 38 between the control box 26 and the solar panel 32, which allows the solar panel 32 to be disconnected from the electronic controls 24 for transport.

A battery 40 is electrically connected to the electronic controls 24 in the control box 26 via a battery connection cable 42. The specific connection of the battery 40 to the electronic controls 24 is further discussed below; however, it should be presently noted that battery connection cable 42 also preferably has a plug-in connector 44 between the control box 26 and the battery 40 to aid in transport. In this regard, the battery 40 may be disconnected from the electronic controls 24 at the plug-in connector 44 and the battery 40 removed from the base 30 to decrease the overall weight of the alarm system 10 during transport.

An audio alarm 46 and a visual alarm 48 are shown mounted on the elongated portion 28 of the alarm system 10. Preferably, these items are mounted near an upper end 50 of the elongated portion 28 so that light from the visual alarm 48 and sound from the audio alarm 46 can be seen and heard at greater distances due to an elevated position. It should also be noted that the audio and visual alarms 46, 48 should be selected according to the particular application and environment in which they are used. In the oilfield, for example, the audio alarm 46 should be loud enough to alert others despite competing noise from other oilfield equipment. One such audio alarm 46 found suitable in this environment is a thirty watt (30 W), outdoor-rated siren manufactured by DSC® with Model Number SD30W and having a 120 db sound level. As for the visual alarm 48, a blue LED beacon manufactured by ECCO® and having Model Number 7970B was found suitable for oilfield applications because it can be seen through fog, but any number of lights may be used depending on the particular application of the alarm system 10.

Figure 2:
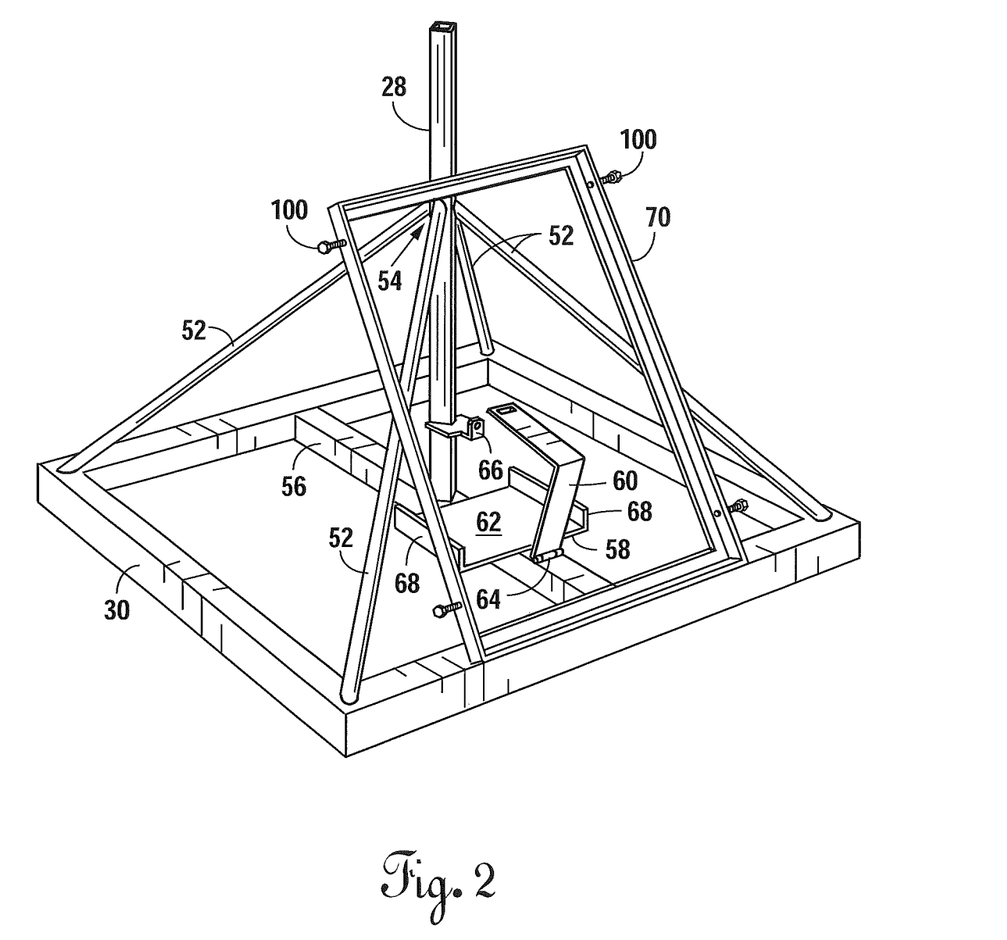
FIG. 2 show a perspective view of the base of the embodiment of FIG. 1.

As shown in FIG. 2, the base 30 is rectangular; however, it can be any shape or configuration which will maintain the elongated portion 28 in an upright position. An alternative configuration for the base 30, for example, may be a tripod configuration (not shown). In its preferred configuration, however, one or more base supports 52 extend from the perimeter of the rectangular base 30 to a position 54 along the elongated portion 28. Additionally, the preferred base 30 has a cross member 56 which extends from opposite sides of the base 30 along the midline of the rectangle. The elongated portion 28 is preferably welded to the cross member 56 and extends upwardly therefrom.

A holding platform 58 and a locking bracket 60 are also attached to the cross member 56. The holding platform 58 provides a surface 62 for the battery 40 to rest on when the battery 40 is installed on the alarm system 10.

Figure 3:
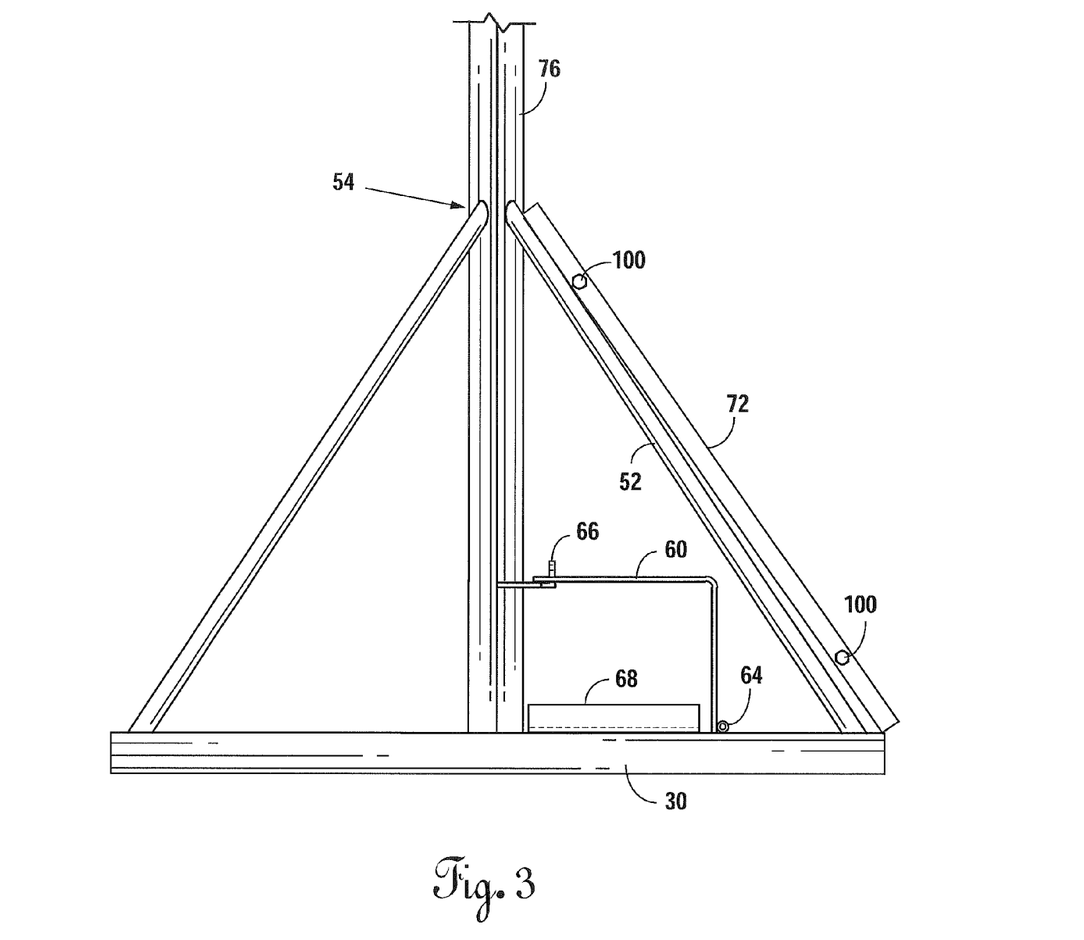
FIG. 3 shows a side elevation view of the base shown in FIG. 2.

As shown in FIG. 3, the locking bracket 60 extends from a hinge 64 mounted on the cross member 56, over the battery 40, and to a lock assembly 66 extending from and mounted to the elongated portion 28. To install the battery 40, the locking bracket 60 is rotated away from the elongated portion 28 and the battery 40 is placed on the surface 62 of the holding platform 58. The locking bracket 60 is then rotated about the hinge 64 to the lock assembly 66 and the lock assembly 66 is locked, thereby preventing the battery 40 from being lifted from the holding platform 58. Additionally, the surface 62 of the holding platform 58 has sides 68 extending upwardly therefrom which prevent the battery 40 from being laterally removed from its position under the locking bracket 60 (see FIG. 4).

Figure 4:
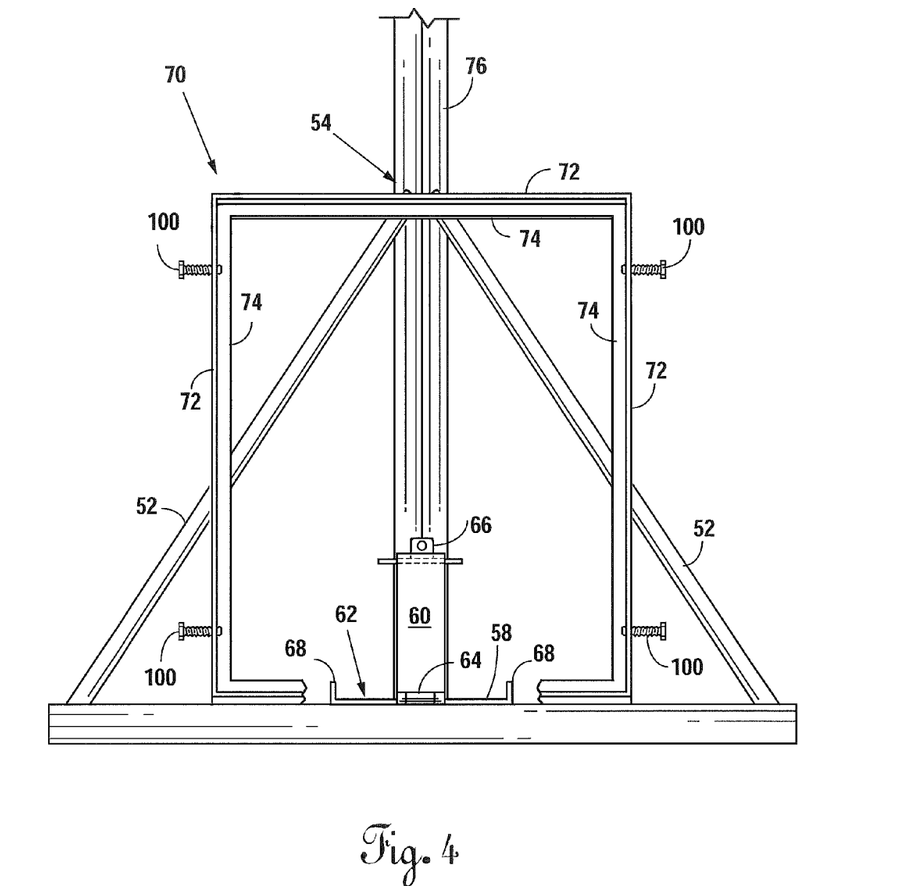
FIG. 4 shows a front elevation view of the base shown in FIG. 2.

FIG. 4 shows a solar panel mounting bracket 70 mounted on two of the base supports 52. The solar panel mounting bracket 70 is sized to correspond with the selected solar panel 32. In this regard, the solar panel 32 fits within sides 72 of the solar panel mounting bracket 70 and rests against resting surfaces 74 on mounting bracket 70. The resting surfaces 74 prevent the solar panel 32 from falling through the solar panel mounting bracket 70. The solar panel 32 is secured to the solar panel mounting bracket 70 by tightening one or more bolts 100 threaded through sides 72 of the mounting bracket 70 against the perimeter of the solar panel 32. The elongated portion 28 is formed by a first elongated member 76 and a second elongated member 78.

Figure 5:
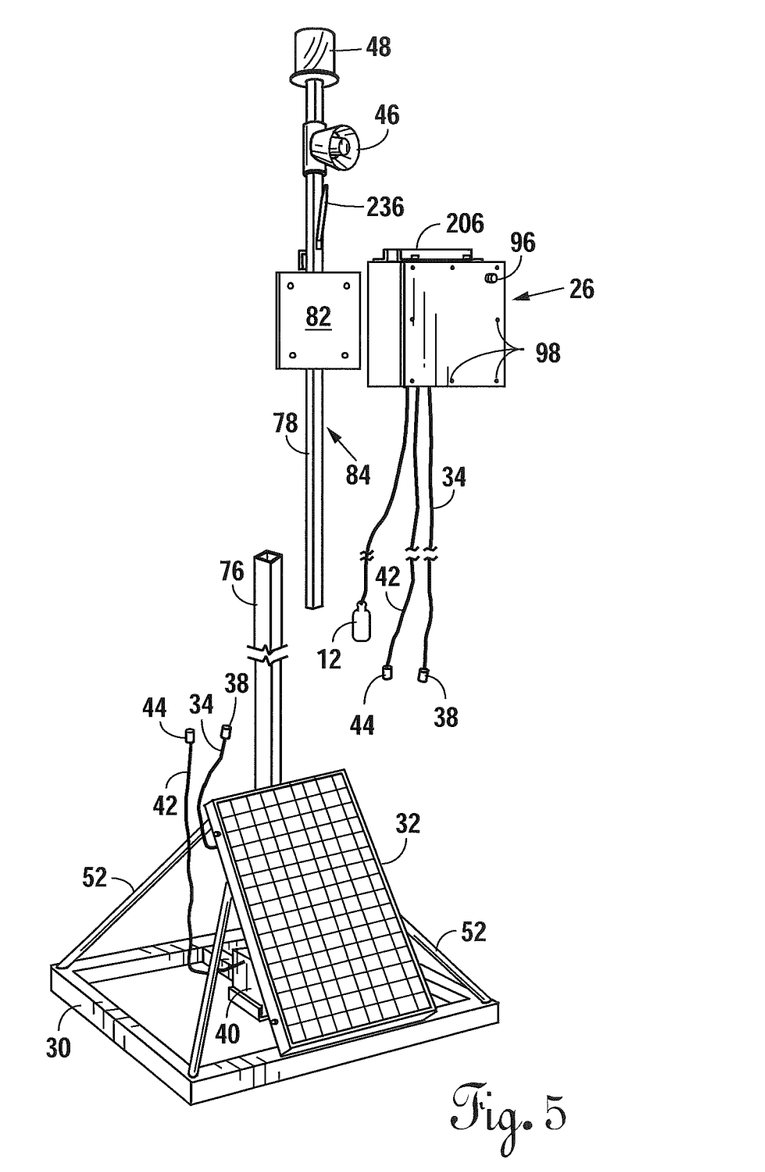
FIG. 5 shows a partially exploded perspective view of an embodiment showing a first elongated member separated from a second elongated member and a control box separated from a mounting plate on the second elongated member.

As shown in FIG. 5, the first elongated member 76 extends from the base 30 and the second elongated member 78 is mounted on the first elongated member 76 when the alarm system 10 is assembled. The first elongated member 76 and the second elongated member 78 may be made from the same or differing materials, depending on the application. In the oilfield application, for example, both are made from hollow steel tubing with a square profile, but the square profile area of the first elongated member 76 is larger than the square profile of the second elongated member 78.

Figure 6:
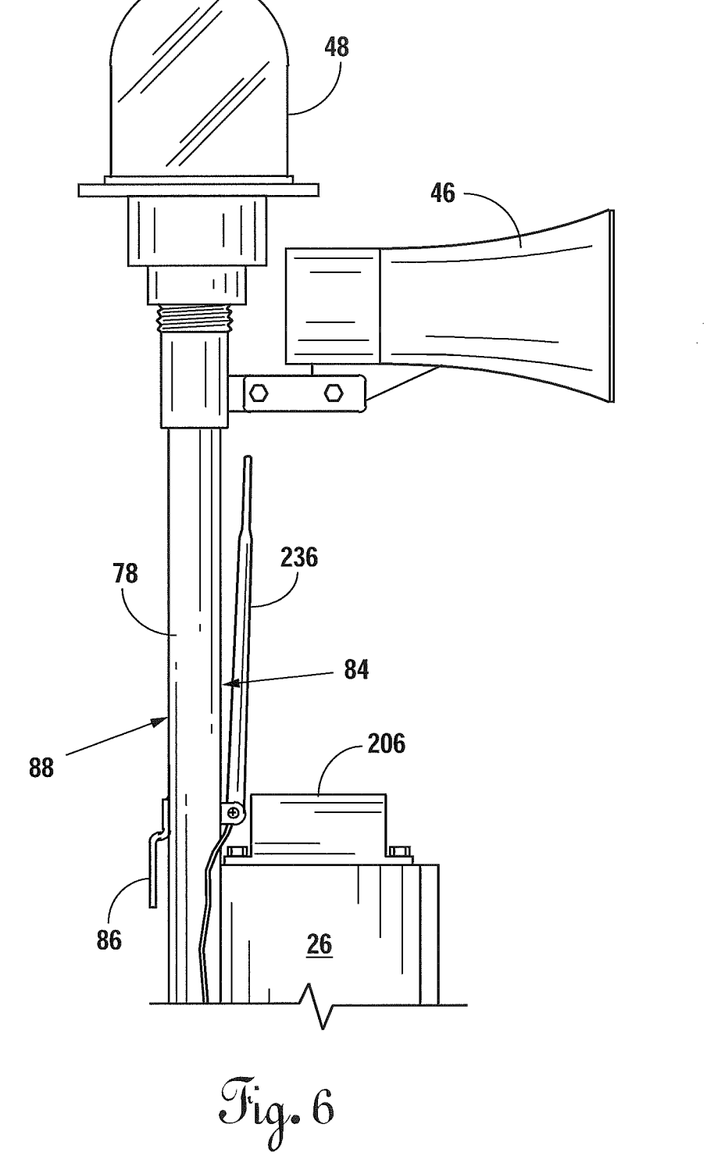
FIG. 6 is a partial side elevation view of an embodiment showing an audio alarm and a visual alarm, as well as a mounting hook on the rear side of the second elongated member.

The control box 26, the audio alarm 46, and the visual alarm 48 are preferably mounted to the second elongated member 78. The control box 26 may be attached with bolts 80 (see FIG. 8) extending through a mounting plate 82 which is preferably welded to one side 84 of the second elongated member 78. The audio and visual alarms 46, 48 are preferably mounted to the second elongated member 78 above the control box 26 and may be mounted in any manner which securely fixes these components thereto. For example, FIGS. 5 and 6 show different configurations of securing the audio and visual alarms 46, 48 to the second elongated member 78.

Figure 7:
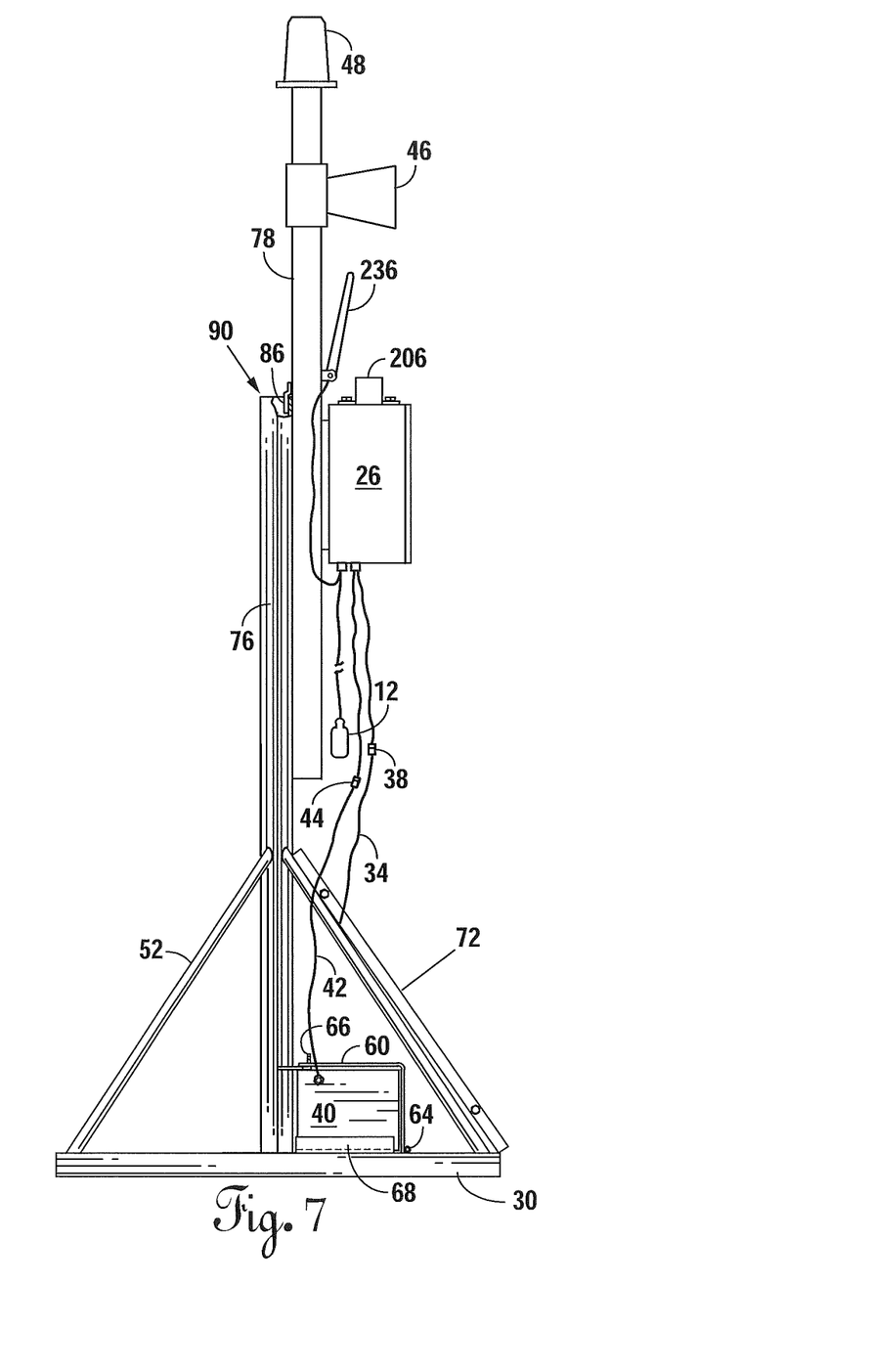
FIG. 7 is a side elevation view of an embodiment with a portion of the first elongated member removed at its upward end for illustration purposes.

Mounting the second elongated member 78 to the first elongated member 76 is achieved with a mounting hook 86 attached to the second elongated member 78. The mounting hook 86 is preferably welded to the second elongated member 78 on a side 88 of the second elongated member 78 opposite the side 84 on which the mounting plate 82 is welded. Mounting hook 86 may be attached slightly above the control box 26 as shown in FIG. 6 or could be positioned elsewhere on the second elongated member 78. Mounting hook 86 is shaped to fit at least partially within an open cavity 90 on an upward end 92 of the first elongated member 76. The open cavity 90 on the upward end 92 of the first elongated member 76 is the hollow interior of the preferred steel tubing and a portion of the mounting hook 86 is inserted therein. The inserted mounting hook 86 holds the second elongated member 76 in position on the first elongated member 78, as shown in FIG. 7.

Figure 8:
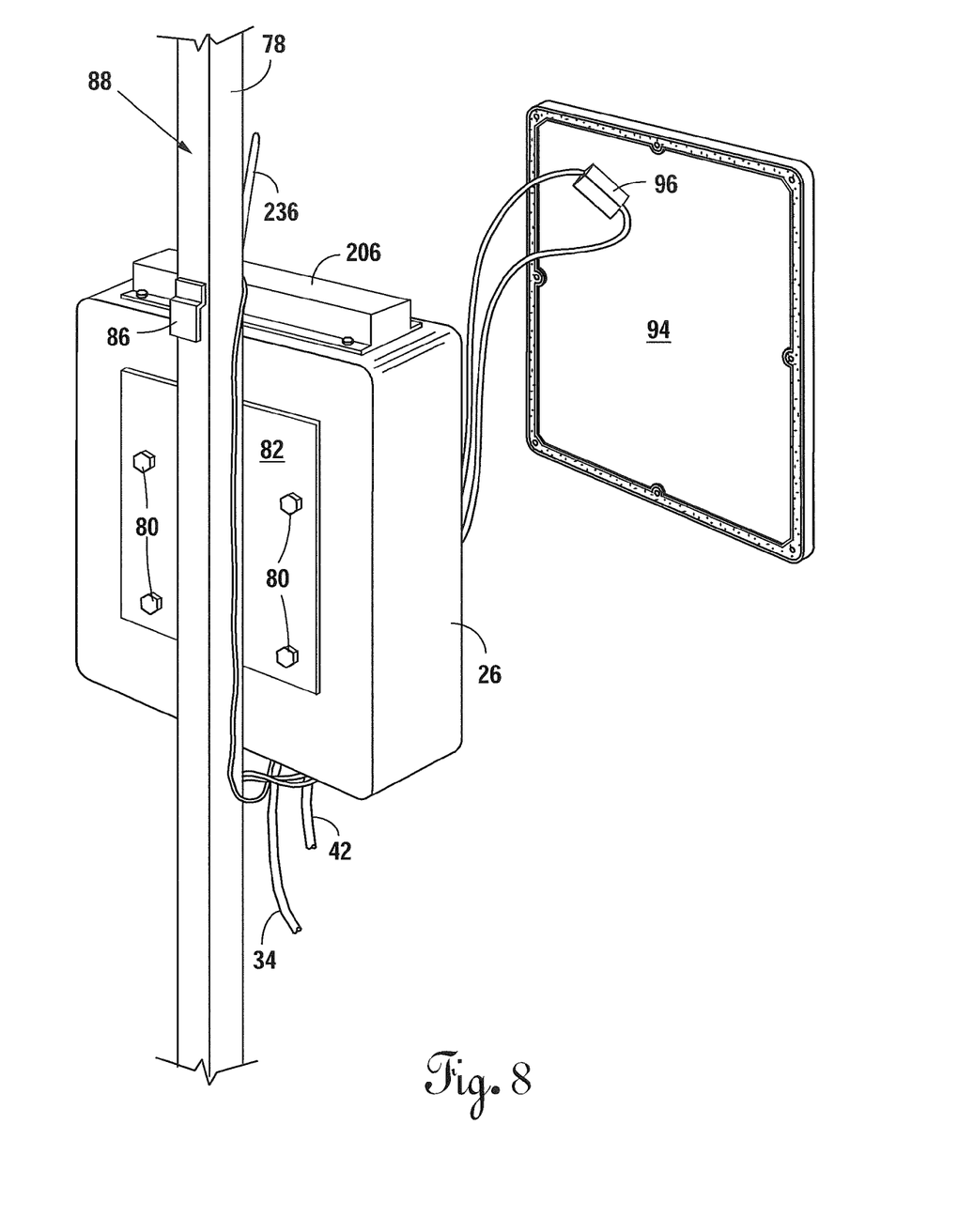
FIG. 8 is an exploded perspective view showing the front cover of the control box removed for illustration purposes.

FIG. 8 shows a front cover 94 removed from the control box 26 and a keyed deactivation switch 96 from the back side of the front cover 94. The front cover 94 is secured to the control box 26 using one or more screws 98. Preferably, screws 98 are tamper-resistant so that unauthorized people cannot remove the front cover 94 from the control box 26. For example, a version of the Torx screw known as "Security Torx," "Tamper-Resistant Torx," or "pin-in-Torx" which has a post in the center of the head and prevents a standard Torx driver from engaging the head may be used.

The keyed deactivation switch 96 allows an authorized person (i.e., someone with the key) to deactivate the alarm system 10 after the fluid level causes the alarm system 10 to be activated. The front side of the keyed deactivation switch 96 on the front cover 94 is shown in FIGS. 1 and 5. As discussed in more detail below, the keyed deactivation switch 96 causes and ceases the flow of electrical current to certain components of the electronic controls 24.

Figure 9:
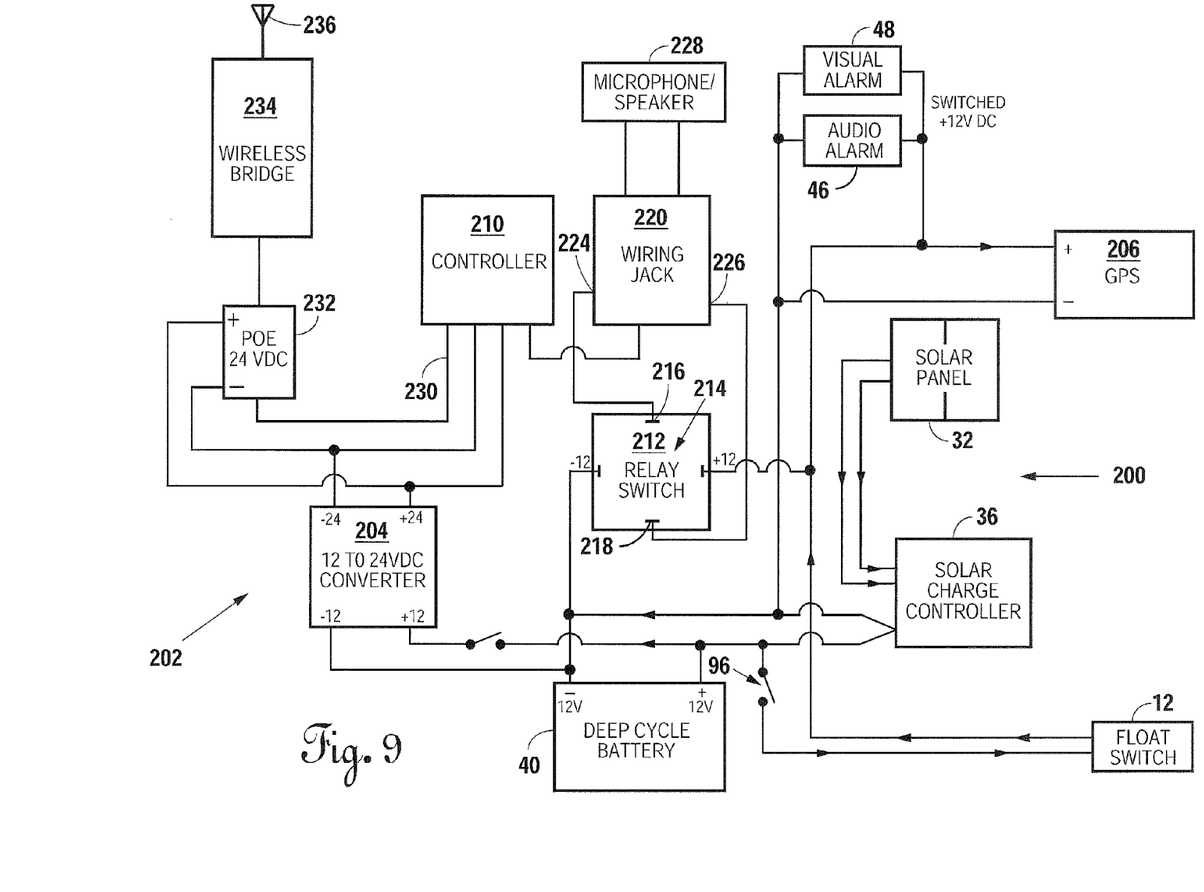
FIG. 9 is a circuit diagram of the electronic controls.

FIG. 9 shows a schematic circuit diagram of the electronic controls 24 of the alarm system 10. In some regards, the electronic controls 24 may be considered as two subsystems. The first is a subsystem 200 with components directly powered with direct current (DC) from the twelve-volt battery 40. The second is a subsystem 202 with components powered with current from a twelve-volt to twenty-four volt DC converter 204. It should be noted, however, that at least a portion of both the first and second subsystems 200, 202 may be powered and may be operational when the fluid level causes the alarm system 10 to sound.

Before discussing the first and second subsystems 200, 202 separately, it should initially be noted that the keyed deactivation switch 96 is open. As noted above, the keyed deactivation switch 96 allows an authorized user to deactivate the alarm system 10 by creating the open circuit. However, when discussing operation of the subsystems 200, 202 it should be presumed that the keyed deactivation switch 96 is closed.

As mentioned supra, the battery 40 sends current directly to components of the first subsystem 200. The battery 40 may be any twelve volt battery; however, an absorbed glass mat (AGM) deep cycle battery has proven to be successful in the oilfield environment. The battery 40 powers the audio and visual alarms 46, 48 as well as a GPS module 206 when the fluid 14 reaches a certain level within the holding tank 16 (see FIG. 1) and the fluid level sensor 12 is activated. When the certain level is reached and the fluid level sensor 12 closes, current flows from the battery 40 to the audio and visual alarms 46, 48 and the GPS module 206 to power those items.

Current to the audio and visual alarms 46, 48 powers those items to create the audible and visual signals discussed above. Power to the GPS module 206 requires further explanation. The GPS module 206 has a GPS module unique identifier assigned to it. Prior to deployment of the alarm system 10 in the field, the GPS module unique identifier is correlated with an alarm system unique identifier assigned to the particular alarm system 10 on which the particular GPS module 206 is being used upon.

When the GPS module 206 is activated after the fluid sensor 12 closes the circuit and current flows to it, the GPS module 206 sends a signal to a satellite (not shown) indicating that the fluid level has reached a critical point. A GPS satellite administrator (not shown) who monitors the satellite receives notification from the satellite that a particular GPS module 206, having a specified GPS module unique identifier, has been activated. The administrator matches the GPS module unique identifier with the alarm system unique identifier to determine which particular alarm system 30 has been activated.

Using this information, the proper authority may be notified of an alarm condition at the identified alarm system 10. For example, in the oilfield application the "company man" may be called on a mobile device (e.g., cellphone, smart phone or the like) or satellite phone or may be emailed on a mobile device (e.g., cellphone, smart phone, tablet or the like) depending on the particular network infrastructure(s) involved.

Concerning the second subsystem 202, this remains inactive unless a toggle switch 208 between the battery 40 and the converter 204 is closed. As shown in FIG. 9, toggle switch 208 is open; however, for purposes of the following discussion, it should be presumed that it is closed (not shown). When the toggle switch 208 is closed, current flows from the battery 40 to the converter 204. The converter 204 converts the twelve volt DC voltage at its input end to twenty-four volt DC voltage at its output end, which will ultimately be supplied to a controller 210 such as the 8028 Session Initiation Protocol (SIP) compatible doorphone controller manufactured by Algo Communications Products Ltd. as further described below. As for the converter 204, the "SCADALink PSC-24" Model offered by Bentek Systems has proven to be successful.

As with the first subsystem 200, current flow in the second subsystem 202 is dependent upon activation of the fluid level sensor 12. When the fluid level sensor 12 is activated, current flows from the battery 40 through a relay switch 212. Activating relay switch 212 closes a connection 214 between a first pin 216 and a second pin 218 through the relay switch 212, which completes the circuit and allows current to flow and power the second subsystem 202. Understanding the circuit of the second subsystem 202, however, requires a discussion of the components connected to the controller 210.

The controller 210 is connected to a telephone wiring jack 220 via a standard phone line 222 plugged into and extending between the controller 210 and the wiring jack 220. A first terminal 224 from the wiring jack 220 is electrically connected to the first pin 216 of the relay switch 212 and a second terminal 226 of the wiring jack 220 is connected to the second pin 218 of the relay switch 212. When relay switch 212 is activated and the connection 214 is closed, a closed circuit is created to activate the controller 210. In this regard, current that flows to the controller 210 from the converter 204 also flows into the wiring jack 220 through a first wire (not shown) within phone line 222, and, closing the connection 214 in the relay switch 212 allows current to flow back to the controller 210 through a second wire (not shown) in the phone line 222. In other words, the first and second terminals 224, 226 are connected to the phone line 222 within the wiring jack 220 to achieve such a current flow back to the controller 210 when the relay switch 212 connection 214 is closed.

Additionally, closing the connection 214 across the relay switch 212 causes current to flow from within the wiring jack 220 to a microphone/speaker component 228 which is electrically connected to the wiring jack 220. Current to the microphone/speaker component 228 activates it and also causes a return signal over the phone line 222 to the controller 210. In this regard, sound from the audio alarm 46 is received by the microphone/speaker component 228 and electronically transmitted back to the controller 210.

Current flow back to the controller 210 activates the controller 210, causing it to dial a specified Internet Protocol (IP) address to where the controller 210 will send a Voice over Internet Protocol (VoIP) signal. The VoIP signal is transmitted from the controller 210 through a Category 5 (Cat5) cable 230 or other type of suitable cable extending between the controller 210 and a Power over Ethernet (PoE) injector 232. After passing through the PoE injector 232, the VoIP signal travels to a wireless bridge 234 and is transmitted from alarm system 10 through an antenna 236. One wireless bridge 234 which has been found suitable for the present alarm system 10 in the oilfield application is a "Wireless Outdoor Access Point & Client Bridge" Model Number EOC1650 offered by the EnGenius® Company, which include the PoE injector 232 as a part of the product.

The VoIP signal is transmitted via the antenna 236 to and received by a corresponding IP address at another wireless bridge (not shown). Included in the transmitted VoIP signal is the sound of the audio alarm 46 which the microphone/speaker component 228 receives when the connection 214 through the relay switch 212 is closed. That sound is carried back to the controller 210 with an electronic signal through the wiring jack 220 as previously discussed. On the receiving end of the transmitted VoIP signal, a person will then hear the audio alarm 46 transmitted via the VoIP signal.

Referring still to FIG. 9, the solar panel 32 is electrically connected to the charge controller 36. The charger controller 36 controls the amount of charging current that flows to the battery 40 and will eliminate the charging current altogether if the battery 40 is fully charged. One charging controller that has been found to work in the oilfield environment, for example, is the "Solar Boost 2000E" offered by Blue Sky Energy, Inc. As for the solar panel, a sixty watt (60 W) panel has been found to provide sufficient power for the electronic controls 24 discussed herein, however, the wattage of the solar panel 32 may need to be increased or decreased depending on the particular application and the particular electronic controls 24.

Figure 10:
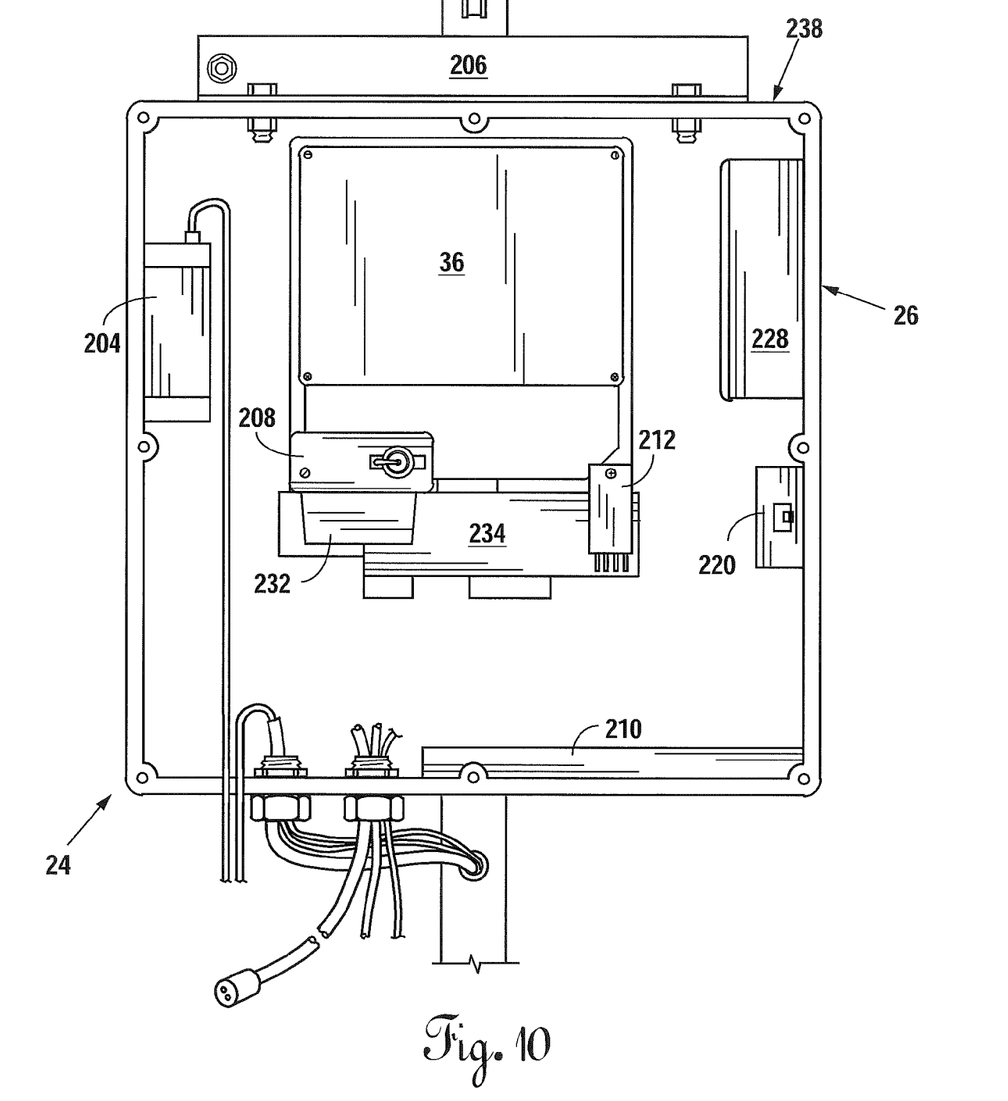
FIG. 10 is a side elevation view of the control box with a front cover removed to illustrate electronic controls within the interior of the control box.

Referring now to FIG. 10, the control box 26 from a front elevation view with the front cover 94 is removed to reveal and illustrate the actual shape of some of the electronic controls 24 previously discussed. Though many of the electronic controls 24 are housed within the control box 26 it should be pointed out that the GPS module 206 is not. The GPS module 206 is mounted on a top surface 238 of the control box 26 so that a connection can be established between the GPS module 206 and the satellite (not shown). Also shown outside the control box 26 is a portion of the antenna 236 which, like the GPS module 206, is better suited to communicate if positioned outside the control box 26 (see FIGS. 1, 5-8).

Although the present invention has been described with reference to a specific embodiment, this description is not meant to be construed in a limiting sense. Various modifications of the disclosed embodiments, as well as alternative embodiments of the invention will become apparent to persons skilled in the art upon the reference to the above description of the invention. It is, therefore, contemplated that the appended claims will cover such modifications that fall within the scope of the invention.

I claim:

1. A method for remote notification of a portable fluid level alarm system, the method comprising the steps of:
   determining the level of a fluid in a fluid container;
   activating a fluid level sensor when said fluid reaches a predetermined critical level in said fluid container;
   generating a signal corresponding to said predetermined critical level;
   transmitting said signal from said fluid level sensor to electronic controls housed in a control box;
   converting said signal into an audible alarm;
   dialing an Internet Protocol address to a predetermined location preprogrammed to receive a Voice over Internet Protocol (VoIP) signal;
   transmitting said VoIP signal to a first wireless bridge;
   transmitting said VoIP signal from a first wireless bridge to a second wireless bridge, said second wireless bridge located at a remote location from said first wireless bridge;
   transmitting said VoIP signal from said second wireless bridge to a telecommunications device;
   converting said VoIP signal into an audible alarm;
   receiving said VoIP signal; and
   hearing said audible alarm transmitted via said VoIP signal.

* * * * *